J. H. HOWARD.
OVERHEAD TROLLEY.
APPLICATION FILED NOV. 10, 1908.
1,006,382.
Patented Oct. 17, 1911.
2 SHEETS—SHEET 1.
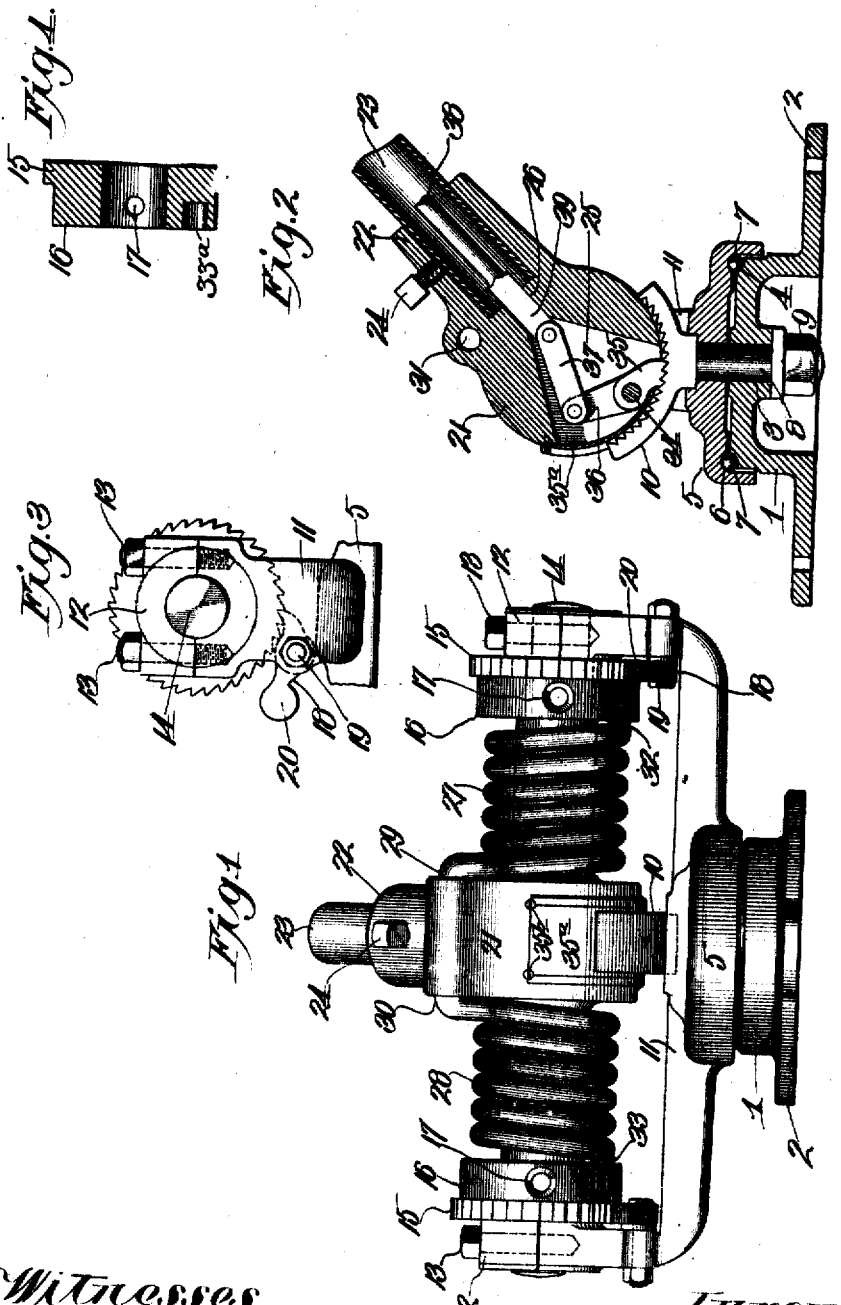
Witnesses
Frank R. Glon
M. A. O'Donnell
Inventor
J. H. Howard
By George H. Thorpe Atty.

J. H. HOWARD.
OVERHEAD TROLLEY.
APPLICATION FILED NOV. 10, 1908.
1,006,382.
Patented Oct. 17, 1911.
2 SHEETS—SHEET 2.
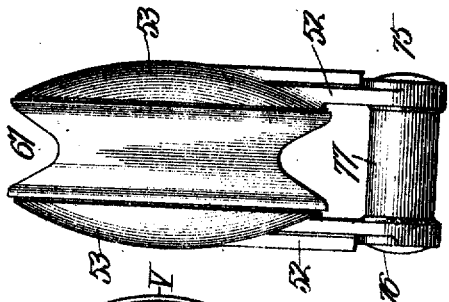
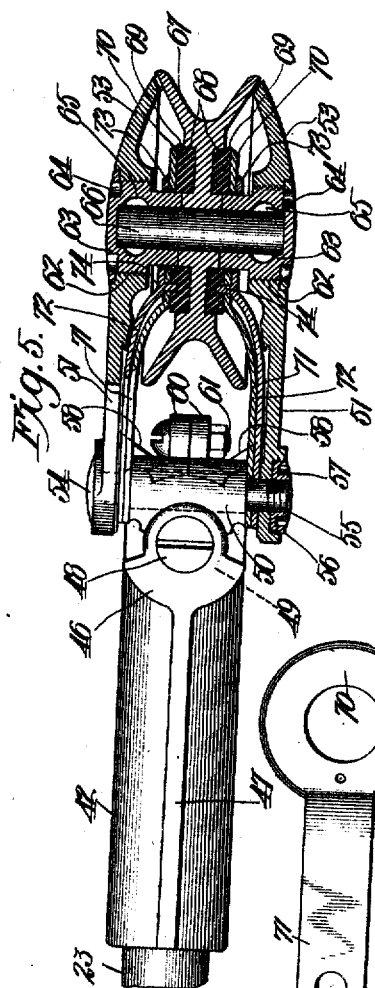
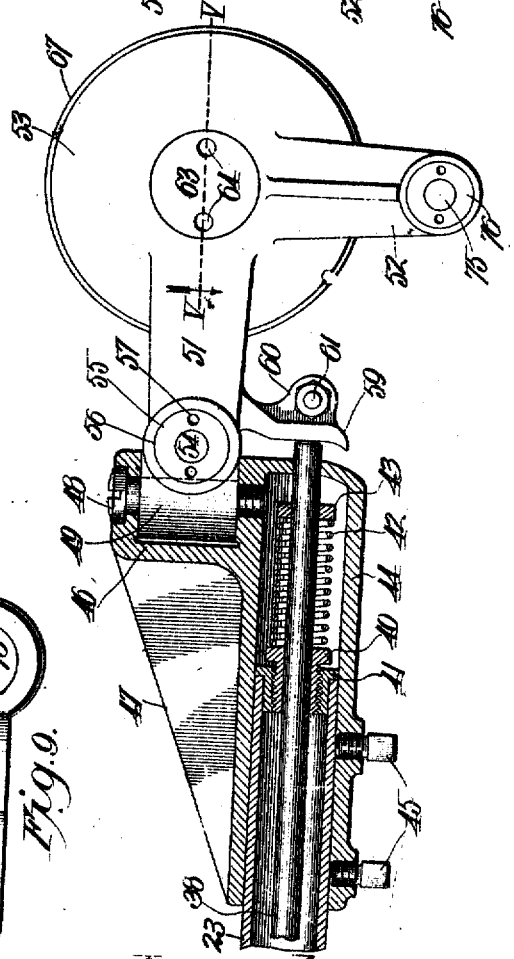
Witnesses
Frank R Glore
M. A. O'Donnell
Inventor
J. H. Howard
By George J Thorpe Atty

UNITED STATES PATENT OFFICE.

JAMES H. HOWARD, OF KANSAS CITY, KANSAS.

OVERHEAD TROLLEY.

1,006,382.  Specification of Letters Patent.  Patented Oct. 17, 1911.

Application filed November 10, 1908. Serial No. 461,980.

*To all whom it may concern:*

Be it known that I, JAMES H. HOWARD, a citizen of the United States, residing at Kansas City, in the county of Wyandotte and State of Kansas, have invented certain new and useful Improvements in Overhead Trolleys, of which the following is a specification.

This invention relates to overhead trolleys for street and interurban cars, and my object is to produce a trolley-pole-mount of such character that the trolley wheel is caused to apply a substantially uniform pressure on the trolley wire irrespective of the height of the latter above the car.

A further object is to provide a trolley pole free to swing up and down as long as the wheel is in engagement with the wire.

Another object is to provide means for locking the trolley pole against material upward movement in the event that the trolley wheel leaves the wire, and to produce means whereby the trolley pole may be unlocked preliminary to replacing the wheel against the wire.

With these general objects in view, and others as hereinafter appear, the invention consists in certain novel and peculiar features of construction and organization as hereinafter described and claimed; and in order that it may be understood, reference is to be had to the accompanying drawings, in which:

Figure 1, is a front view of the base portion of an overhead trolley embodying my invention. Fig. 2, is a central vertical section of the same. Fig. 3, is a view of one end of the same. Fig. 4, is a vertical section of a spring-tensioning ratchet-wheel. Fig. 5, is a view of the upper end of the trolley pole with the trolley wheel and harp in section of the line V—V of Fig. 6. Fig. 6, is a view showing the upper end of the trolley pole and a cap mounted thereon in central longitudinal section, and showing the trolley wheel and harp in side elevation. Fig. 7, is an edge view of the trolley wheel and harp. Fig. 8, is a side view of one of the contacts of the trolley wheel. Fig. 9, is a side view of one of the springs of the trolley wheel.

In the said drawings 1 indicates a preferably hollow circular base provided with an annular flange 2 through which bolts, not shown, are adapted to be fitted to secure the base rigidly upon the car, and said base is provided with a central opening 3 and with a circular raceway 4 concentrically surrounding opening 3.

5 indicates a cap fitting upon the base and provided with an opposing raceway, and 7 indicates balls occupying said raceways and constituting in conjunction therewith a ball-bearing for such cap. Rigid with the cap 5 is a stem 8 journaled in opening 3 and engaged at its lower end by a retaining nut 9, and rigid with said stem and cap and above the latter is an arc-shaped bar 10, its concave face being formed with forwardly-facing ratchet-teeth.

11 indicates angle arms preferably cast with and projecting laterally from opposite sides of the cap, the upwardly-projecting portions of said angle arms being surmounted by bearing caps 12 secured rigidly in position by bolts 13. Journaled in the bearings formed by said arms and caps, is a horizontal shaft 14 preferably reduced at its ends, as shown, and rigidly secured in any suitable manner on said shaft, near each end, is a ratchet-wheel 15 provided with a hub 16, having one or more holes 17 into which a bar or lever, not shown, may be inserted for the purpose of turning said wheel.

To guard against back rotation of the ratchet-wheel, or downward movement of the trolley-pole hereinafter referred to, the arms 11 carry dogs 18, bolts 19 secured to said arms, forming pivotal supports for said dogs, the front ends of the dogs being preferably weighted as at 20 to hold the dogs yieldingly in engagement with the ratchet wheels. The shaft 14 is arranged axially with respect to the ratchet bar 10 and centrally is formed or provided with a circular enlargement 21 vertically above the ratchet bar, which enlargement practically forms the base of the trolley-pole, as it is provided with a radial tubular projection 22 to form a socket for the reception of the pole 23 and is equipped with a set-screw 24 to secure the pole reliably to said socket. In the vertical plane of the ratchet bar, the base 21 of the trolley pole is provided with a relatively large opening 25 communicating with the passage of the trolley pole through a small passage 26 which by preference is angular in cross-section.

Fitted upon the shaft at opposite sides of the base of the trolley pole is a pair of springs 27 and 28, the inner or adjacent ends of said springs terminating in inwardly-projecting portions 29 and 30 respectively, engaging a hole 31 in the base of the trolley pole. The opposite ends of said springs terminate in outwardly-projecting portions 32 and 33 respectively engaging sockets 33ᵃ in the inner faces of the hubs of the ratchet wheels. In practice these springs are both adapted to swing the trolley pole upward, and preferably the springs will be so adjusted as to exert the greatest upward pressure on the pole when the wheel of the latter engages a low trolley wire.

34, is a pivot pin secured in the base of the trolley pole across opening 25, and mounted on said pin is a dog 35 provided with an upwardly projecting arm 36 pivotally connected by a link 37 with the lower end of a rod 38 extending through and projecting beyond the upper end of the trolley pole, the lower end of the rod being preferably angular in cross section as at 39 so as to fit nonrotatably in the passage 26. The dog 35 is out of engagement with the ratchet-bar 10 when the trolley pole occupies an operative relation to the trolley wire, not shown, and is adapted to be swung downward beyond the periphery of the said base of the trolley pole and engage the ratchet-bar in the event of the trolley wheel leaving the wire, it being obvious that the swing of the trolley pole is adapted to dispose the dog 35 opposite different teeth of the underlying ratchet-bar. In any position that the pole occupies, the ratchet-bar bridges and closes that part of the opening 25 provided to accommodate the pivotal movement of the dog; the remainder of such opening, which should be relatively large in order to permit the dog 35 and link 37 to be secured in position, is closed by a bridge plate 35ᵃ secured in place by screws 35ᵇ, the plate serving as a water and dust guard. The rod 38 extends slidingly through a nut 40 engaging an externally-threaded cap 41 fitting in the upper end of the trolley-pole 23, and surrounding the projecting end of the rod is a helical spring 42 bearing at its opposite ends against nut 40 and the collar 43 rigidly secured on the rod, the tendency of this spring being to slide rod 38 upward to cause the dog 35 to swing downward and engage the ratchet-bar 10. The tension of spring 42 may be varied by adjusting nut 40.

44 is a tubular cap or head fitting on the upper end of the trolley pole and secured rigidly thereto by screws 45, and through the closed or upper end of said cap the rod 38 slidingly projects. At its closed end the cap is formed with an upwardly-projecting arm 46 braced by a rib 47 and equipped with a pivot bolt 48, on which is pivoted a coupling consisting of a vertical tubular portion 49 and a horizontal tubular portion 50, the vertical portion being mounted on the pivot-bolt 48.

The trolley harp is of bell-crank-shape in side elevation, that is, comprises a pair of horizontal arms 51 and a pair of depending arms 52, the pairs of arms at their junction points being formed with circular enlargements 53 with convex outer sides. The front ends of the arms 51 are pivoted on a horizontal bolt 54 extending through the tubular arm 50 of the coupling hereinbefore described, a circular convex-faced nut 55 engaging the threaded end of, said bolt and fitting in a socket 56 in the outer face of the adjacent arm 51, the nut preferably being of that type which is adapted to be turned by a spanner instead of an ordinary wrench, that is to say, it is provided with holes 57 to receive the arms of the spanner. The arms 51 are provided with inwardly-projecting arms 58 terminating in segmental portions 59 in line with and rearward of the rod 38, said portions 59 being curved concentrically of pivot bolt 48 so that they shall always be in position to exert a downward and forward pressure on rod 38, and projecting from the segmental portions 59 of said arms are ears 60 bolted rigidly together at 61. The circular enlargements 53 of the harp are provided centrally with threaded openings 62 to receive steel or equivalent bearing caps 63, provided by preference with holes 64 to receive the arms of a spanner utilized for screwing the caps in and out of position, and said caps are provided with internal grooves 65 to form reservoirs for a lubricant such as grease or solidified oil.

66 is a preferably aluminum spindle or shaft journaled in the caps and rigidly secured on said spindle or shaft is a trolley wheel 67 provided with circular recesses 68 in opposite sides for the reception of carbon or equivalent disks 69.

70 indicates contact plates engaging the outer faces of the carbon disks and provided with arms 71 which fit by preference on pivot-bolt 54 at opposite ends of the coupling arm 50.

72 indicates springs which also preferably fit on bolts 54 between arms 71 and the sides of the harp, and said springs are preferably provided with heads 73 which encircle the bearing caps and press the contact plates 70 firmly against the carbon disks, and the said springs are preferably provided with inwardly projecting pins 74 which extend through said contacts and into carbon disks to hold the latter stationary. Under the pressure of the springs a good electrical connection is maintained between the carbon disks and the trolley wheel.

75 indicates a bolt connecting the arms 52 below the trolley wheel and engaged at its threaded end by a spanner-nut 76, and 77 is a sleeve journaled in said bolt between said arm to act as a brace for the latter and a means of connection for the trolley rope, not shown.

When the parts are properly assembled and the trolley wheel is engaging the trolley wire the resistance offered by the wire is greater than that of spring 42 and hence, the trolley harp is swung downward and the portions 59 force rod 38 downward and thereby effect the withdrawal of dog 35 from the ratchet bar 10, the parts maintaining this relation as long as the trolley wheel is engaged with the wire, and it will be noticed in this connection that as the car rounds a curve the harp will swing laterally on pivot 48 to compel the trolley wheel to track more perfectly with the curving trolley wire and more reliably maintain its engagement with the latter. By thus permitting the wheel to accommodate the curves of the wire, the former is subjected to less wear and the latter less lateral strains. Should the trolley wheel leave the wire accidentally from any cause, the springs 27 and 28, or the one which is exerting the upward pressure at the time, will start the pole upward but such movement is checked almost instantly, because the instant the trolley wheel leaves the wire, spring 42 forces rod 38 upward and hence causes dog 35 to engage the ratchet-bar 10 and lock the pole. By thus checking the pole almost instantly chance of injurious contact of the trolley pole with cross wires is reduced to the minimum. As the conductor pulls downward on the rope to lower the trolley wheel, the harp swings downward and through its portions 59 forces rod 38 downward so as to overcome the resistance of spring 42 and withdraw the dog from engagement with the ratchet-bar, this action being instantly followed by downward movement of the pole itself. The pull on the rope holds the parts in this position so that as the rope is paid out again to effect the reëngagement of the trolley wheel with the wire, the dog is not released and cannot check such movement of the pole, as the pull of the rope on the harp has the same effect as the resistance of the wire when the trolley wheel is engaging the same.

From the above description it will be apparent that I have produced an overhead trolley embodying the features of advantage enumerated as desirable and which is obviously susceptible of modification without departing from the principle and scope or sacrificing any of the advantages of the invention.

Having thus described the invention, what I claim as new and desire to secure by Letters Patent is:

1. An overhead trolley comprising a base, a cap arranged to rotate horizontally on said base, a ratchet-bar to turn with said cap and having its toothed face concaved and disposed upwardly, a trolley pole provided with a base bearing a pivotal relation to said cap and adapted to operate in a vertical plane, means for exerting a yielding upward pressure on the trolley pole, a trolley wheel, a harp carrying said wheel and bearing a pivotal relation to the pole and adapted to swing in a vertical plane, a spring-elevated rod carried by said pole adapted to be yieldingly depressed by said harp, a dog pivoted to the base of the pole, and a connection between said rod and dog for causing the latter to swing out of or into engagement with the ratchet-bar accordingly as said rod is depressed or elevated.

2. An over-head trolley comprising a base, a cap arranged to rotate horizontally on said base, a ratchet-bar to turn with said cap and having its toothed face concaved and disposed upwardly, a trolley pole provided with a base bearing a pivotal relation to said cap and adapted to operate in a vertical plane, means for exerting a yielding upward pressure on the trolley pole, a rod slidingly arranged in the trolley pole, a dog pivoted to the base of the trolley pole and pivotally linked to the lower end of said rod, a spring tending to slide said rod upwardly to cause the dog to engage the ratchet-bar, a harp pivoted for vertical movement to the upper end of the pole and provided with a portion for engagement with the upper end of said rod, and a trolley wheel carried by said harp.

3. An overhead trolley comprising a base, a cap arranged to rotate horizontally on said base, a ratchet-bar to turn with said cap and having its toothed face concaved and disposed upwardly a trolley pole provided with a base bearing a pivotal relation to said cap and adapted to operate in a vertical plane, means for exerting a yielding upward pressure on the trolley pole, a rod slidingly arranged in the trolley pole, a dog pivoted to the base of the trolley pole and pivotally linked to the lower end of said rod, a spring tending to slide said rod upwardly to cause the dog to engage the ratchet-bar, a harp pivoted to the upper end of the pole and capable of swinging vertically and laterally and provided with a portion for engagement with the upper end of said rod, and a trolley wheel journaled in the harp.

4. An overhead trolley comprising a base, a cap arranged to rotate horizontally on said base, a ratchet-bar to turn with said cap and having its toothed face concaved and disposed upwardly a trolley pole provided with a base bearing a pivotal relation to said cap and adapted to operate in a vertical plane, means for exerting a yielding upward pressure on the trolley pole, a dog pivoted to the base of the trolley pole and pivotally linked to the lower end of said rod, a spring tending to slide said rod upwardly to cause the dog to engage the ratchet-bar, a harp pivoted to the upper end of the pole and capable of swinging vertically and laterally and provided with a portion for engagement with the upper end of said rod, a part carried by the harp rearward of its pivotal point for connection with a trolley rope, and a trolley wheel journaled in the harp above the said part.

5. An overhead trolley, comprising a base, a cap arranged to rotate horizontally on said base, a ratchet-bar rotatable with said cap and having its toothed face concaved and disposed upwardly, a trolley pole provided with a base bearing a pivotal relation to said cap and adapted to operate in a vertical plane, a plurality of springs exerting upward pressure on the trolley pole, means for individually tensioning said springs, a trolley wheel, a harp carrying said wheel and bearing a pivotal relation to the pole and adapted to swing in a vertical plane, a spring-elevated rod carried by said pole and adapted to be yieldingly depressed by said harp, a dog pivoted to the base of the pole, and a connection between said rod and dog for causing the latter to swing out of or into engagement with the ratchet-bar accordingly as said rod is depressed or elevated.

6. An overhead trolley, comprising a base, a cap arranged to rotate horizontally on said base, a ratchet-bar rotatable with said cap and having its toothed face concaved and disposed upwardly, a trolley pole provided with a base bearing a pivotal relation to said cap and adapted to operate in a vertical plane, a plurality of springs exerting upward pressure on the trolley pole, a ratchet-wheel connected to one end of each of said springs, to be turned to tension such springs, means to prevent accidental back rotation of each wheel, a trolley wheel, a harp carrying said wheel and bearing a pivotal relation to the pole and adapted to swing in a vertical plane, a spring-elevated rod carried by said pole and adapted to be yieldingly depressed by said harp, a dog pivoted to the base of the pole, and a connection between said rod and dog for causing the latter to swing out of or into engagement with the ratchet-bar accordingly as said rod is depressed or elevated.

In testimony whereof I affix my signature, in the presence of two witnesses.

JAMES H. HOWARD.

Witnesses:
FRANK R. GLOVE,
G. Y. THORPE.